Patented Apr. 29, 1952

2,595,158

UNITED STATES PATENT OFFICE 2,595,158

RUST PREVENTING COMPOSITION AND METHOD OF PREPARING SAME

Cyril Frederick McCue, Kingston, and William Edwin John Broom, Westminster, London, England, assignors to Standard Oil Development Company, a corporation of Delaware No Drawing. Application June 9, 1949, Serial No. 98,154. In Great Britain September 30, 1948

12 Claims. (Cl. 106—14)

The present invention relates to rust inhibiting compositions and more particularly to slushing compositions of the type containing waxes, soaps and the like, adapted to form solid or substantially solid coatings on ferrous metals, and the like.

In the prior art it has been proposed to prepare slushing compositions containing waxes such as petrolatum, metal soaps, mahogany sulphonates and degras, together with a volatile solvent, and/or a heavy lubricating oil. The purpose of such compositions is to provide a soft slushy coating, which while giving adequate corrosion protection and weather resistance, is readily removable manually. To this end the proportions of such blends are so adjusted that the residue left after the evaporation of the solvent (if any) is of a suitable consistency. If this is not done, and compositions are prepared by the conventional techniques using too high a proportion of hard waxes relative to the softer non-volatile ingredients, the composition tends to flake or crack on drying and so to lose its protective power.

It has also been proposed in the prior art to use as rust preventing coatings suspensions or solutions of waxes, soaps, and the like, in volatile hydrocarbons, such as petroleum naphtha, mineral spirits and the like. In these compositions the volatile hydrocarbon evaporates, leaving a protective film upon the surface to be protected.

The present invention has for its object the preparation of a protective composition in the form of a stable wax suspension in a liquid condition which will dry to leave a hard protective film capable of taking a reasonable polish if desired. Such a composition is of considerable value for the protection of such surfaces as painted semi-decorative metal work, e. g., the bodies of automobiles, whose appearance would suffer by the application of soft coatings of the type referred to above.

It has been discovered, according to the present invention, that such compositions may be prepared by the use of de-oiled petrolatum as the wax, together with a suitable corrosion inhibitor and volatile solvent, in controlled proportions and using a particular method of preparation to prepare the wax suspension, and with the addition of a suspension stabilizer should it be necessary.

The wax used is so-called "microcrystalline wax" which is a de-oiled petrolatum consisting essentially of branched chain paraffins. The oil content of such waxes is normally from 5-10% but may be as low as 1% by weight. Their melting point, for purposes of the present invention, ranges preferably between about 140° and 185° F. (60° to 85° C.), and preferably at least a small part of the wax has a melting point in the upper part of this range.

Any of the corrosion inhibitors conventionally used in protective compositions of this type may be used. Examples are sodium mahogany (oil-soluble petroleum) sulphonates, protective animal fatty materials such as lanolin or wool-grease or mixtures thereof. As mentioned earlier, the ratio of corrosion inhibitor to wax should be sufficiently low to ensure the production of the desired hard film, but the requirements are readily ascertainable experimentally for any given combination of materials.

As solvent there is used any volatile solvent (e. g., one boiling within the range of 40-150° C.) in which the wax is sparingly soluble at room temperature and readily soluble when hot. Particularly suitable are light hydrocarbon fractions such as gasoline, solvent naphtha and white spirit, although other materials having the required solvent and evaporative properties may be selected from other classes of solvent, such as alcohols, ketones and halogenated hydrocarbons.

The proportions to be used are from 5 to 20 parts by weight of wax for each 100 parts by weight of finished product, and a minor proportion of the order of a few parts by weight (e. g., 0.5 up to about 2 or 3) of the inhibitor and a comparable amount of the stabilizer if used. Stabilizers are preferably employed but may be omitted where storage stability is of no importance.

As stabilizers, there are used water-insoluble soaps of long chain, i. e., $C_{12}$ to $C_{22}$, fatty acids such as oleic, stearic and palmitic acid; the preferred metals are the alkaline earth metals, lithium, and aluminum.

To prepare the suspension in the desired form, the wax is dissolved in the (hot) solvent, which is warmed to at least 40° C. and is preferably heated above the wax melting point when convenient, and the solution is then cooled rapidly and with continuous agitation. In this way there is prepared a suspension of the microcrystalline wax of very small particle size, and it is found that this suspension has a good degree of stability, particularly when the wax concentration is relatively high. The stability is markedly enhanced, however, by the inclusion of a small percentage of stabilizer soap such as the aluminum stearate previously mentioned. The corrosion inhibitor may be added at any stage of the preparation, but it is preferred to dissolve all the ingredients together in the hot solvent and then to chill to obtain the suspension. The stabilizer (if used) should preferably be added before precipitation of the wax.

The resulting suspensions may be applied by brushing, spraying or other conventional means, and on drying they leave a smooth wax-like film. By suitable selection of the wax or waxes used in the composition, the residual film can be made relatively hard and capable of taking a good polish. This property is very desirable in such applications as the protection of automobile bodies for export, and particularly good results have been obtained by using, at least in part, the microcrystalline waxes having relatively high melting points (e. g., in the region of 180–185° F.).

Typical examples of suitable compositions prepared by the method already specified, percentages being by weight, are set out below:

Example 1

79% Petroleum spirit (B. P. 90–120° C.)
10% Microcrystalline wax (M. P. 140–145° F.)
7% Microcrystalline wax (M. P. 180–185° F.)
2% Lanolin
1% Petroleum sulphonates
1% Aluminum stearate

Example 2

93% Petroleum spirit (B. P. 50–150° C.)
5% Microcrystalline wax (M. P. 150–185° C.)
1% Lanolin
1% Aluminum stearate

What is claimed is:

1. The process of preparing a rust preventing coating composition capable of forming a hard polishable film on metal surfaces, which comprises dissolving 5 to 20% by weight, based on the total composition, of a microcrystalline wax in a hydrocarbon solvent having a boiling point between about 40° and about 150° C., heating said solvent to a temperature of at least 40° C. to facilitate solution and dispersion of said wax, adding 0.5 to 3% of metal soap of $C_{12}$ to $C_{22}$ fatty acid and 0.5 to 3% of a rust inhibitor comprising lanolin, and thereafter rapidly chilling with continuous agitation to obtain a stable suspension of small wax particles in salt water.

2. Process according to claim 1 wherein the rust inhibitor is lanolin and oil soluble petroleum sulfonate.

3. The method of preparing an improved rust preventing composition which comprises forming a solution of 5 to 20% by weight, based on the total composition, of a microcrystalline wax in a volatile solvent said solvent boiling in the range of about 40° to 150° C., at a temperature of at least 40° C., and thereafter rapidly chilling said solution with continuous agitation whereby a stable suspension of small wax particles in said solvent is formed, said composition including a small amount of a rust inhibitor.

4. The method of claim 3 wherein said solvent is selected from the class consisting of hydrocarbons, alcohols, ketones and halogenated hydrocarbons.

5. The method of claim 3 wherein said wax has a melting point in the range of about 60° to 85° C.

6. The method of claim 3 wherein said rust inhibitor comprises lanolin.

7. The method of claim 3 wherein said composition includes below 3% of a water insoluble metal soap of $C_{12}$ to $C_{22}$ fatty acid.

8. The method of preparing an improved rust preventing composition which comprises forming a solution of 5 to 20% by weight, based on the total composition, of a microcrystalline wax having a melting point in the range of about 60° to 85° C. in a solvent boiling below about 150° C. and in which said wax is sparingly soluble at room temperature, by heating to a temperature in the range of 40° C. to a temperature above the melting point of said wax, and thereafter cooling said solution rapidly with continuous agitation to form a stable suspension of small wax particles in said solvent, said composition including in the range of 0.5 to 3.0 weight % of a rust inhibitor.

9. A rust preventing composition consisting essentially of 5 to 20 weight %, based on the total composition, of a suspension of small microcrystalline wax particles in a volatile solvent in which the wax is sparingly soluble at room temperature, said solvent boiling below about 150°, and 0.5 to 3.0% by weight of a corrosion inhibitor, said suspension being formed by dissolving said wax in said solvent at a temperature of at least 40° C. and thereafter cooling rapidly the resulting solution with continuous agitation.

10. A composition as in claim 9 in which said rust inhibitor is selected from the class consisting of oil soluble petroleum sulfonates, protective animal fatty materials and mixtures thereof.

11. A rust preventing composition capable of forming a hard polishable film on metal surfaces consisting essentially of a volatile hydrocarbon solvent boiling within the range of about 50° to 150° C., 5 to 20% by weight, based on the total composition, of microcrystalline wax having a melting point range between about 60° to 85° C., with at least part of said wax having a melting point in the upper part of said range, 0.5 to 3% of a corrosion inhibitor comprising lanolin, and 0.5 to 3% of a water insoluble metal soap of $C_{12}$ to $C_{22}$ fatty acid, said composition being heated to a temperature of at least 40° C. whereby said wax is dissolved in said solvent and thereafter rapidly chilling said composition with continuous agitation to obtain a stable suspension of small wax particles therein.

12. Composition according to claim 11 wherein said soap is aluminum stearate.

CYRIL FREDERICK McCUE.
WILLIAM EDWIN JOHN BROOM.

REFERENCES CITED

The following references are of record in the file of this patent:

UNITED STATES PATENTS

| Number | Name | Date |
|---|---|---|
| 2,182,992 | Lebo | Dec. 12, 1939 |
| 2,359,946 | Sudholz et al. | Oct. 10, 1944 |